US006267702B1

(12) United States Patent
Ravaglia et al.

(10) Patent No.: US 6,267,702 B1

(45) Date of Patent: Jul. 31, 2001

(54) PULLEY WITH AUTOMATIC EMERGENCY BRAKE

(75) Inventors: Giovanni Ravaglia; Angelo Olani, both of Genoa (IT)

(73) Assignee: Tornomeccanica S.r.l., Genoa (IT)

( * ) Notice: Subject to any disclaimer, the term of this patent is extended or adjusted under 35 U.S.C. 154(b) by 0 days.

(21) Appl. No.: 09/448,226

(22) Filed: Nov. 24, 1999

(30) Foreign Application Priority Data

May 28, 1999 (IT) ........................................ GE99A0057

(51) Int. Cl.[7] ........................................ F16H 55/36

(52) U.S. Cl. ........................................ 474/171; 474/175

(58) Field of Search ........................................ 474/171–175, 474/61–65, 59, 68, 67, 74; 187/89, 38, 90; 123/185.3, 185.2; 192/42, 36, 54.52; 182/5, 8, 234, 239; 242/238.1; 280/806, 808, 805; 254/369, 372

(56) References Cited

U.S. PATENT DOCUMENTS

| | | | | |
|---|---|---|---|---|
| 3,881,361 | * | 5/1975 | Newell | 474/175 X |
| 3,915,268 | * | 10/1975 | MacDonald | 474/171 X |
| 4,040,305 | * | 8/1977 | McCabe | 474/171 X |
| 4,327,881 | * | 5/1982 | Fohl | 242/107.2 |
| 4,538,703 | * | 9/1985 | Ellis et al. | 182/5 |
| 5,052,523 | * | 10/1991 | Ericson | 187/89 |
| 5,513,607 | * | 5/1996 | Doragrip et al. | 123/185.3 |

FOREIGN PATENT DOCUMENTS

050363 * 8/1982 (EP) .

OTHER PUBLICATIONS

IBM Technical Disclosure Bullitin, (NN55041080) "Power Platen Indexing Mechanism", Apr. 1965.*

IBM Technical Disclosure Bullitin, (NN78112411) "Lever Control Mechanism For a Doc. Stacker", Nov. 1978.*

* cited by examiner

*Primary Examiner*—Mary Ann Green
*Assistant Examiner*—Marcus Charles
(74) *Attorney, Agent, or Firm*—Richard M. Goldberg

(57) ABSTRACT

Pulley with automatic emergency brake including a disk (1) guiding the rope (3) having a pull (7) and a load leg (8), rotary supported by a suitable yoke (5), this pulley being provided with a double walled rocker arm (9), the outer walls of which are mounted on the yoke (5) by means of transverse pivot pins (10) off-centered with respect to the shaft axis (4) of the above disk (1) in the direction of the pull leg (7) of the rope. The above rocker arm (9) has the shape of a right-angled triangle, its hypotenuse being slantwise located at the top, its smaller acute angle (α) located at the bottom towards the load leg (8) of the rope where an adjustable balance weight (12) is placed, whereas the greater acute angle (β) is located at the upper end of the pull leg (7) of the rope where a transverse pin (13) is provided with a grip wedge (14) to release or block the rope (3) in the race (2) of the pulley disk (1) and finally the right angle (γ) at the bottom towards the pull leg (7) of the rope featuring a snatch block (11) on which the pull rope (7) slides causing the release of the rope (3) when pulled, whereas the counterweight (12) will block the rope (3) when the pull leg (7) of the rope is not in traction.

5 Claims, 4 Drawing Sheets

PULLEY WITH AUTOMATIC EMERGENCY BRAKE

BACKGROUND OF THE INVENTION

Pulleys to facilitate hoisting and lowering of loads and general products are well known. These pulleys are especially used in the building and construction sectors and are normally handled by two persons, one of them being placed at the top where the pulley is fastened and the other at floor level.

This pulley consists of a disk with a supporting groove or race guiding the rope, idling around its shaft supported by a yoke equipped with a fastening device.

These pulleys have no protective device to prevent the load from falling down when the pull leg of the rope is released by the operator at floor level. Some pulleys have been provided with a safety ratchet gear blocking the load and consisting of a gear wheel keyed onto the disk shaft and a ratchet but this safety system has several drawbacks, the most important of which is the fact that this ratchet gear has to be released for each operation and this is extremely dangerous.

SUMMARY OF THE INVENTION

This invention has the aim to eliminate this drawback and to provide the pulley with an automatic safety brake. This braking system consists of a double walled rocker arm having the shape of a right-angled triangle, its hypotenuse being slantwise located at the top, its smaller acute angle ($\alpha$) located at the bottom towards the load leg of the rope, whereas the greater acute angle ($\beta$) is located at the upper end of the manual pull leg of the rope.

This rocker arm is secured to the outside of the pulley yoke by means of transverse axle pivot pins, slightly offset with respect to the shaft axis of the pulley sheave in the direction of the manual pull rope. A snatch block is fastened at a right-angle ($\gamma$) level of the rocker arm at the bottom towards the pull rope, whereas an adjustable counterweight is mounted at the level of the smaller acute angle ($\alpha$). At the level of the greater acute angle ($\beta$), a transverse axle pin bearing a grip wedge may be inserted between the rope lodged in the pulley race and a bushing supported by a transverse pin fixed onto the yoke thus blocking the rope in the pulley race.

In this way, the brake is operating as follows:

When the load is applied to the lifting or lowering rope, the pull rope handled at floor level by the operator, will push against the snatch block located at the right-angle ($\gamma$) of the triangle. This thrust will override the action of the counterweight and will force the rocker arm to rotate (clockwise in the drawing) so as to remove the wedge and keep it outside, so that the rope can freely move.

If action on the pull rope is lacking for any reason whatsoever, the counterweight will cause the snatch-block to move in the opposite direction (counter-clockwise in the drawing) and the wedge will slip between the bushing of the yoke and the rope thus blocking any rope movement. Usually, the gripping surface of the wedge in touch with the rope will be rifled or toothed so as to heighten the reciprocal blocking action.

When the load leg of the rope is unloaded, this load leg has only to be moved outwards in order to push a pawl which will cause the rocker arm to rotate clockwise, thus pulling out the grip wedge so that the rope can run downwards.

This proves that the automatic brake, subject matter of this invention, will ensure an absolutely safe operation of the pulley during its load lifting and lowering motion without any risk whatsoever of dropping the load.

BRIEF DESCRIPTION OF THE DRAWINGS

The invention in question is illustrated in one exemplifying implementation in the enclosed drawings in which.

DETAILED DESCRIPTION

Figure 1:
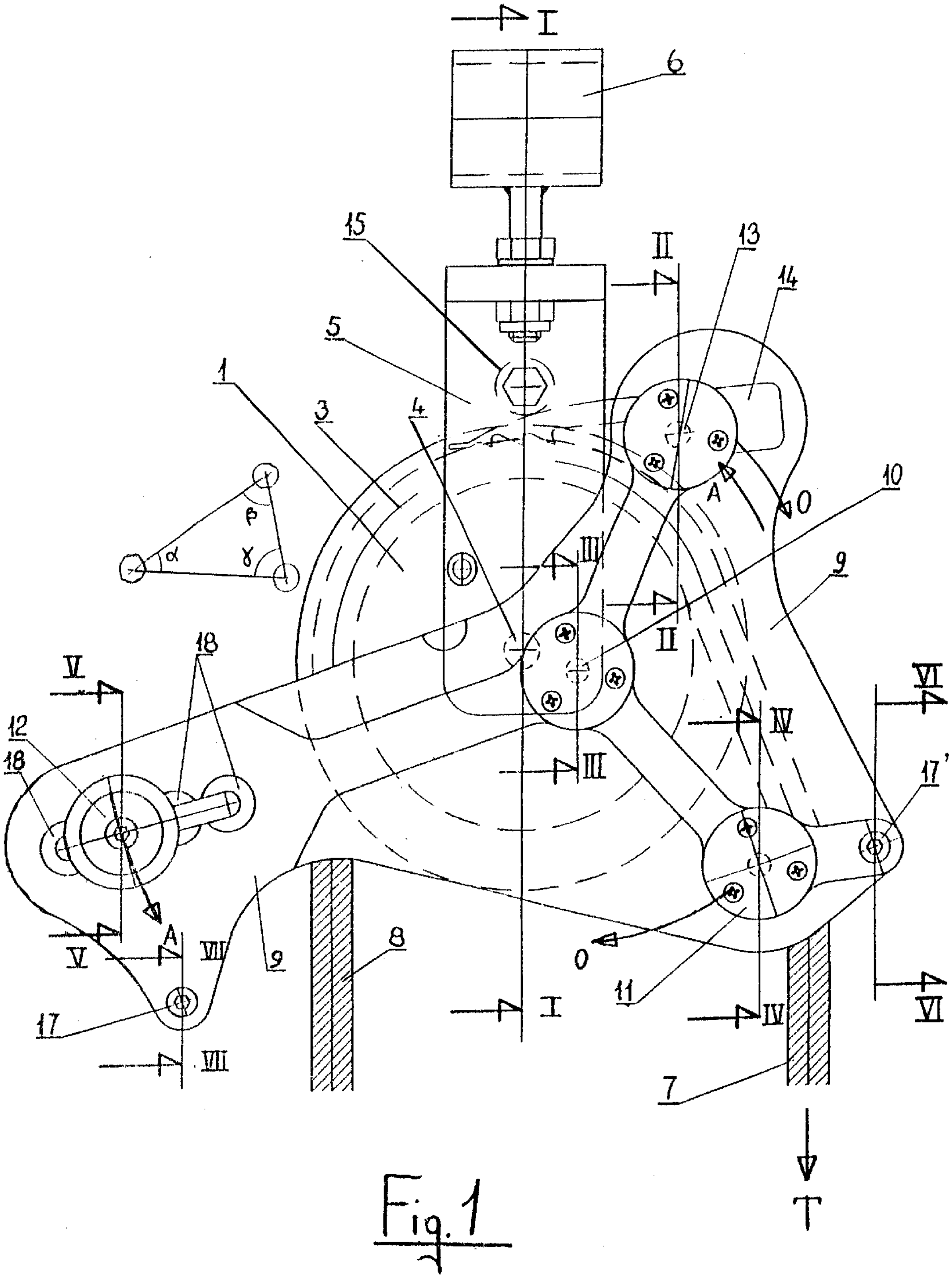
FIG. 1 shows a side view of the pulley subject matter of this invention.
Figure 2:
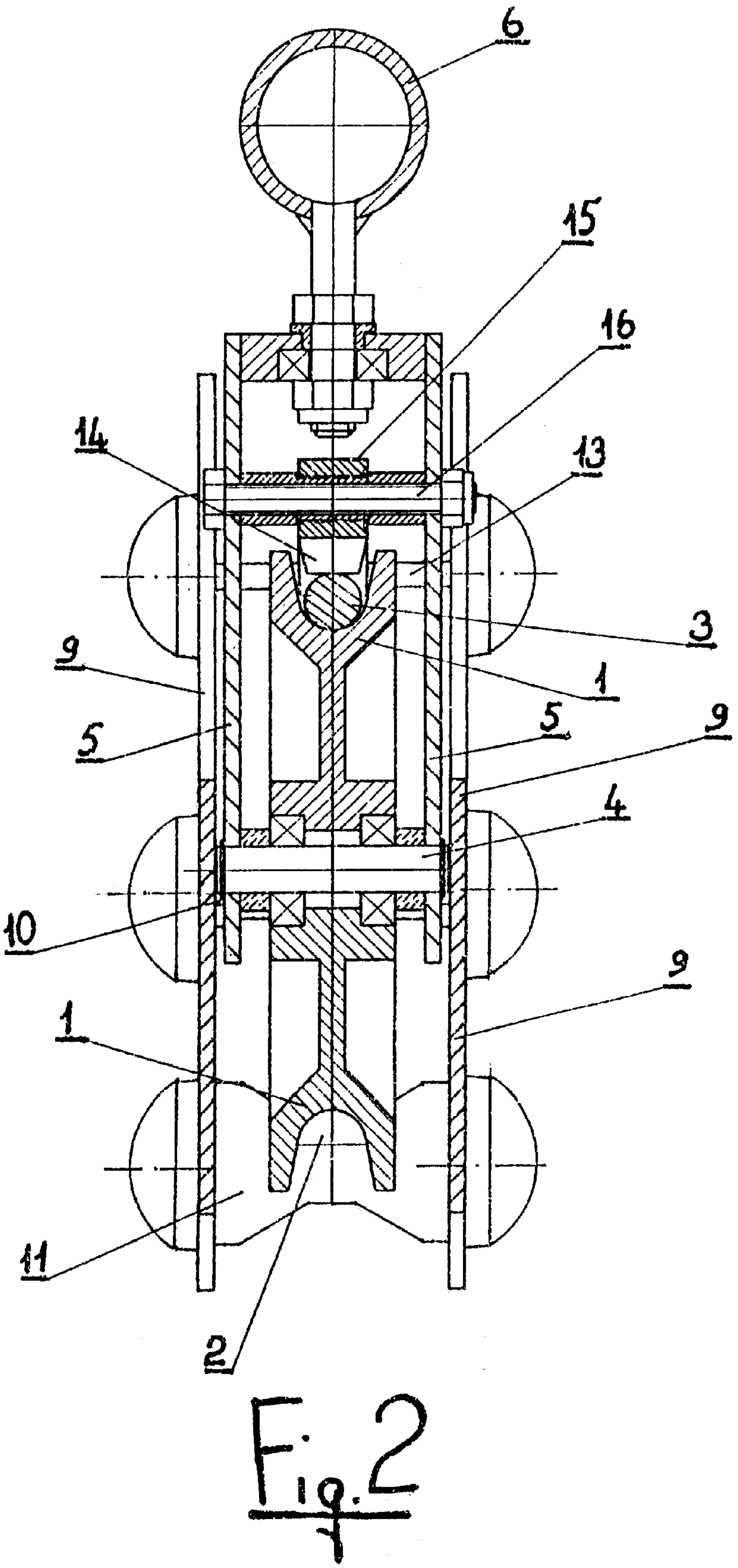
FIG. 2 shows the cross section of this pulley taken along line I—I in FIG. 1
Figure 3:
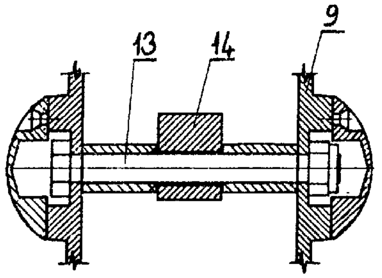
FIG. 3 shows the cross-section of this pulley taken along line II—II in FIG. 1
Figure 4:
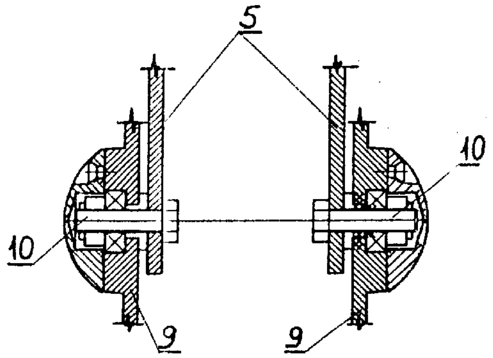
FIG. 4 shows the cross section taken along line III—III in FIG. 1
Figure 5:
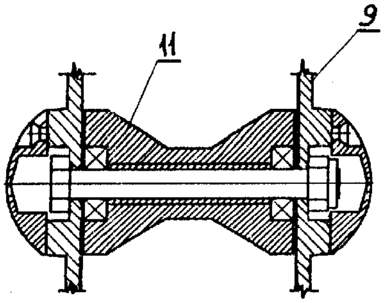
FIG. 5 shows the cross section taken along line IV—IV in FIG. 1
Figure 6:
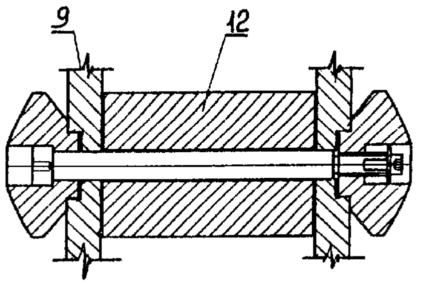
FIG. 6 shows the cross section taken along line V—V in FIG. 1
Figure 7:
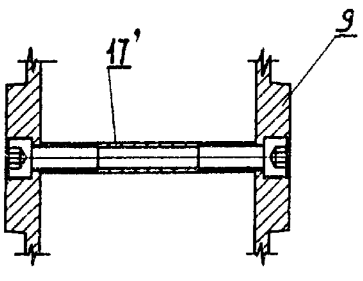
FIG. 7 shows the cross section taken along line VI—VI in FIG. 1.
Figure 8:
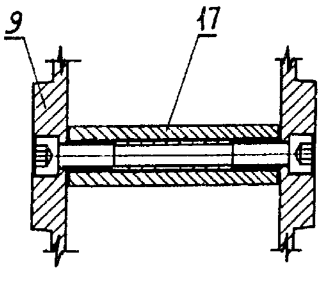
FIG. 8 shows the cross section taken along line VII—VII in FIG. 1.

With reference to the above drawings, the pulley consists of a disk 1, with a peripheral groove 2 supporting and guiding the rope 3; this disk is rotatinig on its shaft 4 transverse mounted on the pulley yoke 5. This yoke 5 features at its upper end a device 6 of any kind by which the pulley may be fastened to a supporting structure such as for instance the pipe of a scaffolding.

These substantial pulley components as described above feature a pull leg 7 of the rope which is pulled by the operator stationed at floor level, who also ties and unties the load to be lifted or lowered by the other load leg 8 of the rope. The other pulley operator is stationed at the top and provides for untying or positioning of the load on the corresponding load leg 8 of the rope and then lowering the load leg 8 when it has to return down to take up a new load.

According to this invention and as shown in the drawings, the pulley features a double walled rocker arm 9 shaped like a right angled triangle, its hypotenuse being slantwise located at the top, its smaller acute angle $\alpha$ being located at the bottom towards the load leg 8 of the hoisting rope, whereas the greater acute angle $\beta$ is located at the manual pull leg 7 of the rope.

The external walls of this rocker arm 9 are fastened onto the pulley yoke 5 by means of transverse pivot pins 10 slightly off center with respect to the shaft axis 4 of the pulley disk 1 in the direction of the manual pull leg 7 of the rope.

At right angle level $\gamma$ a snatch block 11 with a transverse revolving axle is fixed to the rocker arm on which the pulling leg 7 of the rope is sliding, whereas an adjustable counterweight 12 is mounted at the level of the smaller acute angle $\alpha$. At the level of the greater acute angle $\beta$ there is located a transverse axle pin 13 bearing a grip wedge 14 with rifled or toothed lower surface which may be inserted between the rope 3 resting on the race or groove 2 of the pulley disk 1 and a bushing 15 mounted on the transverse pin 16 fastened to the yoke 5, thus compressing ahd blocking the rope inside the pulley race 2.

Figure 9:
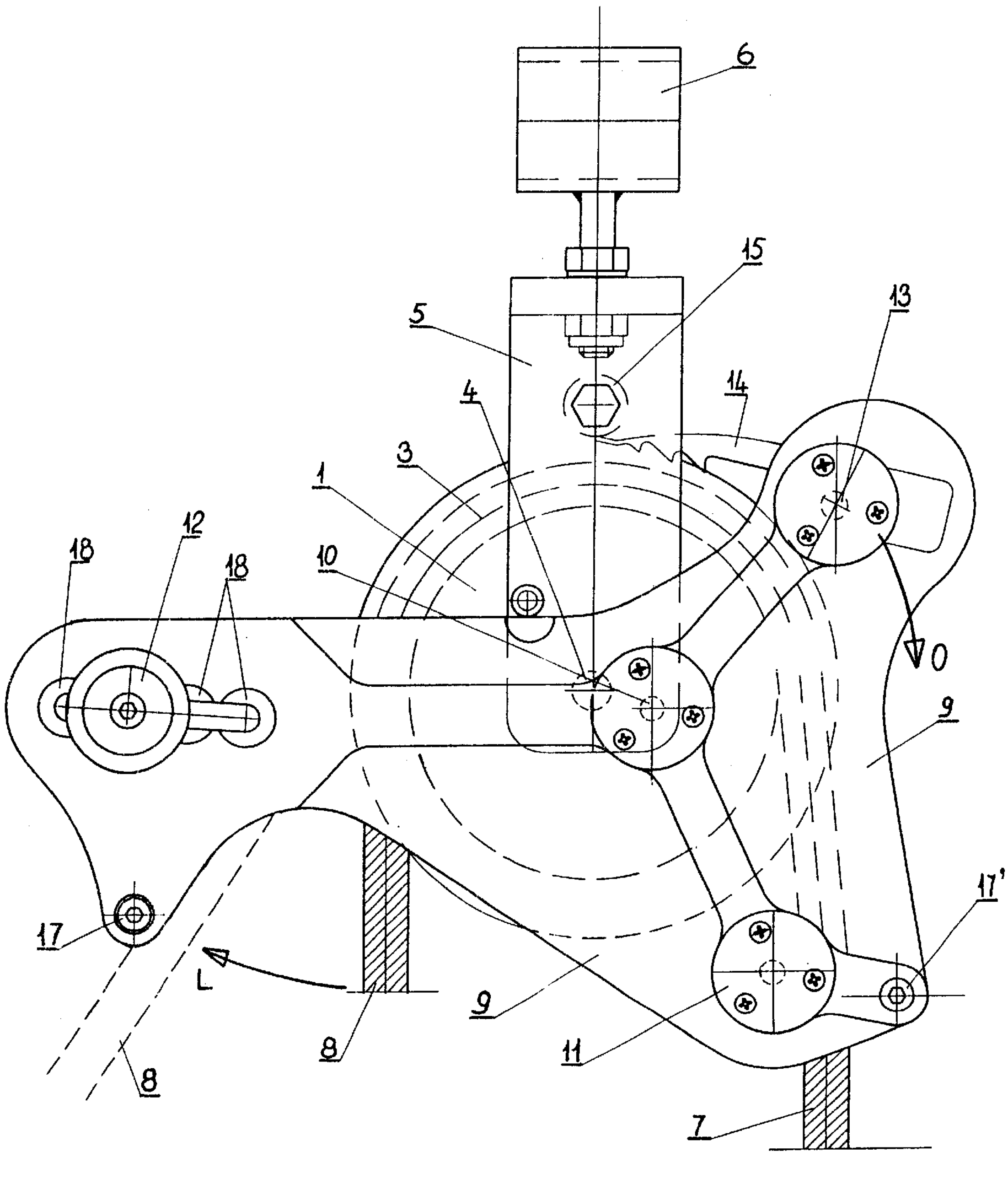
FIG. 9 shows a side view of the pulley with the rocker arm rotated clockwise to release the load leg of the rope without a load being attached to it.

The system is completed by a transverse catch 17' located at right angle level γ with the aim to prevent undesirable shifting of the rope while another transverse catch 17, located at the level of the smaller acute angle α, will act as a releasing and lowering device for the load rope 8 when without load (cf. FIG. 9).

The operation of the system may be easily inferred from the above description.

When a load is attached at the lower or upper end of the load leg 8 of the rope 3, the operator at floor level will act on the pull leg 7 of the rope 3 and by this pulling action (arrow T) the rope is pushed against the snatch block 11 thus causing the rocker arm 9 to move clockwise to remove the grip wedge 14 and release the rope 3 (arrow O)

Should the operator, by inadvertency, lose at any time hold of the pull rope 7, the counterweight 12 will rotate the rocker arm 9 counter-clockwise (arrow A) pushing the grip wedge between the rope 3 and the bushing 15, thus blocking the rope.

When the load leg 8 of the rope 3 is unloaded and the end of this leg is at the top) of the hoisting path (load lifting), this end is moved outwards (arrow L) pushing against the catch 17 located at the smaller acute angle α of the rocker arm 9 which causes the grip wedge 14 to rotate clockwise (arrow O) and release the rope which may now be pushed downwards by the operator stationed at the top. When loads are being lowered, the load rope 8 is released from its load at floor level and is lifted by the operator working at floor level simply by drawing the pull rope 7.

The counterweight 12 is adjustable in various positions 18 so as to adjust the lever arm to the pivot pin 10 of the rocker arm 9 depending from the pulley height and the resulting length and weight of the pull rope.

Obviously, the above invention may be used with any sheave or pulley, with different lifting power and applications, if necessary by replacing some components by others having the same objective.

What is claimed is:

1. A pulley with an automatic emergency brake comprising:

a disk with a peripheral race to support and guide a rope having a pull leg and a load leg for lifting and lowering loads, while the disk is rotating on a shaft thereof;

a yoke for supporting the shaft;

an upper coupling device fitted with the yoke;

a double walled rocker arm having corners forming a triangle shape with a hypotenuse slantwise located at a top thereof and with two acute angles, which include a greater angle corner and a smaller angle corner the greater angle corner is located on the pull leg and the smaller angle corner is located on the load leg of the rope, and a substantially right angle corner, the rocker arm having two outer walls fixed to the pulley yoke by transverse pins that are off centered with respect to the shaft of the disk in a direction of the pull rope;

a transverse axled snatch block located at the substantially right angle corner of the triangle shape on the rocker arm on which the pull leg of the rope slides;

an adjustable counterweight mounted at the smaller acute angle corner of the triangle shape on the rocker arm;

a bushing fitted on a transverse pin mounted on the pulley yoke;

a transverse axle pin located at the greater acute angle corner of the triangle shape on the rocker arm;

a grip wedge mounted on the transverse axle pin for slipping between the rope in the race of the pulley disk and the bushing for compressing and blocking the rope in the race or for leaving a blocking position and releasing the rope, wherein by pulling the pull leg of the rope and by pushing the snatch block, the rocker arm will rotate and remove the grip wedge, while by slackening the pull leg of the rope, the counterweight will cause the rocker arm to rotate, apply the grip wedge and thus block the rope.

2. A pulley as described in claim 1, further comprising a transverse catch at the smaller acute angle corner of the triangle shape on the rocker arm acting as a pawl when moving the load leg of the pull rope and useful to clear the load leg of the pull rope and let the rope down without load.

3. A pulley as described in claim 1, further comprising a transverse catch fitted at the substantially right angle corner of the triangle shape on the rocker arm to prevent unforeseen and undesirable movements of the pull rope.

4. A pulley as described in claim 1, wherein the counterweight can be placed in various positions so that it is possible to adjust a consequent lever arm relative to a pivot axis of the rocker arm about the at least one transverse pin based upon a weight and length of the pull rope.

5. A pulley as described in claim 1, wherein the grip wedge includes a lower surface facing the rope and is machined and toothed to increase a gripping action.

* * * * *